June 17, 1969 G. STEIN 3,450,058
SEGMENTED OIL FILM BEARING FOR FLUID TRANSLATOR
Filed Dec. 5, 1966 Sheet 1 of 2

INVENTOR
GARY STEIN
BY Robellard and Byrne
ATTORNEYS

United States Patent Office 3,450,058
Patented June 17, 1969

3,450,058
SEGMENTED OIL FILM BEARING FOR FLUID TRANSLATOR
Gary Stein, Brookfield, Wis., assignor to Applied Power Industries, Inc., Menomonee Falls, Wis., a corporation of Wisconsin
Filed Dec. 5, 1966, Ser. No. 599,211
Int. Cl. F04b *1/18;* B21d *53/10*
U.S. Cl. 103—173          2 Claims

ABSTRACT OF THE DISCLOSURE

A fluid motor of the axial piston type wherein an inclined rotating cam plate reciprocates said piston, and the resulting axial thrust forces are borne by a plurality of pivotally supported segmental bearings between the motor housing and one side of the cam plate and the thrust forces are also borne by hydrostatic forces developed between the inclined surfaces of the cam plate and the piston slippers.

---

This invention relates to a fluid translator and more particularly relates to a fluid translator wherein the developed forces of axial pistons are supported in a more efficient manner to thus provide a translator of rugged quality and improved operating efficiency.

An important objective of this invention is to provide a fluid translator of the axial piston type in which the axial thrust forces, developed as a result of the pistons engaging the inclined cam surface, are borne by a plurality of segmented bearings which include accurately located pivot members to which the segments are mounted.

A further objective of this invention is to provide novel means, in the combination described, for maintaining the piston slippers in engagement with the inclined cam surface. This objective is obtained through the use of novel plastic inserts which line the openings of a lightweight, rigid, high-tensile strength steel ring commonly called a "keeper ring" in the art.

Another important objective of this invention is to provide methods for fitting pivoted segmented bearings into position whereby the surfaces of the bearings are located accurately in a common plane.

A still further objective of this invention is to provide a novel hold-down means for the keeper ring which retaining means is located centrally of the keeper ring.

Another objective of this invention is to provide a fluid motor wherein there is a full speed differential between the piston shoes and the camming plate to thereby obtain a counterbalance from the developed oil film therebetween.

A further objective of this invention is to provide in a fluid translator of the type described with means to absorb thrust forces by a dual system, one of which includes an oil film bearing between the pivoting piston shoes and the inclined surface of the cam plate and the other between the reverse side of the cam plate and a pivoting bearing means in engagement therewith.

These and other objects of the invention will become better understood by those skilled in the art by reference to the following detailed description when viewed in light of the accompanying drawings wherein like reference numerals through the figures thereof indicate like parts and wherein.

Figure 1:
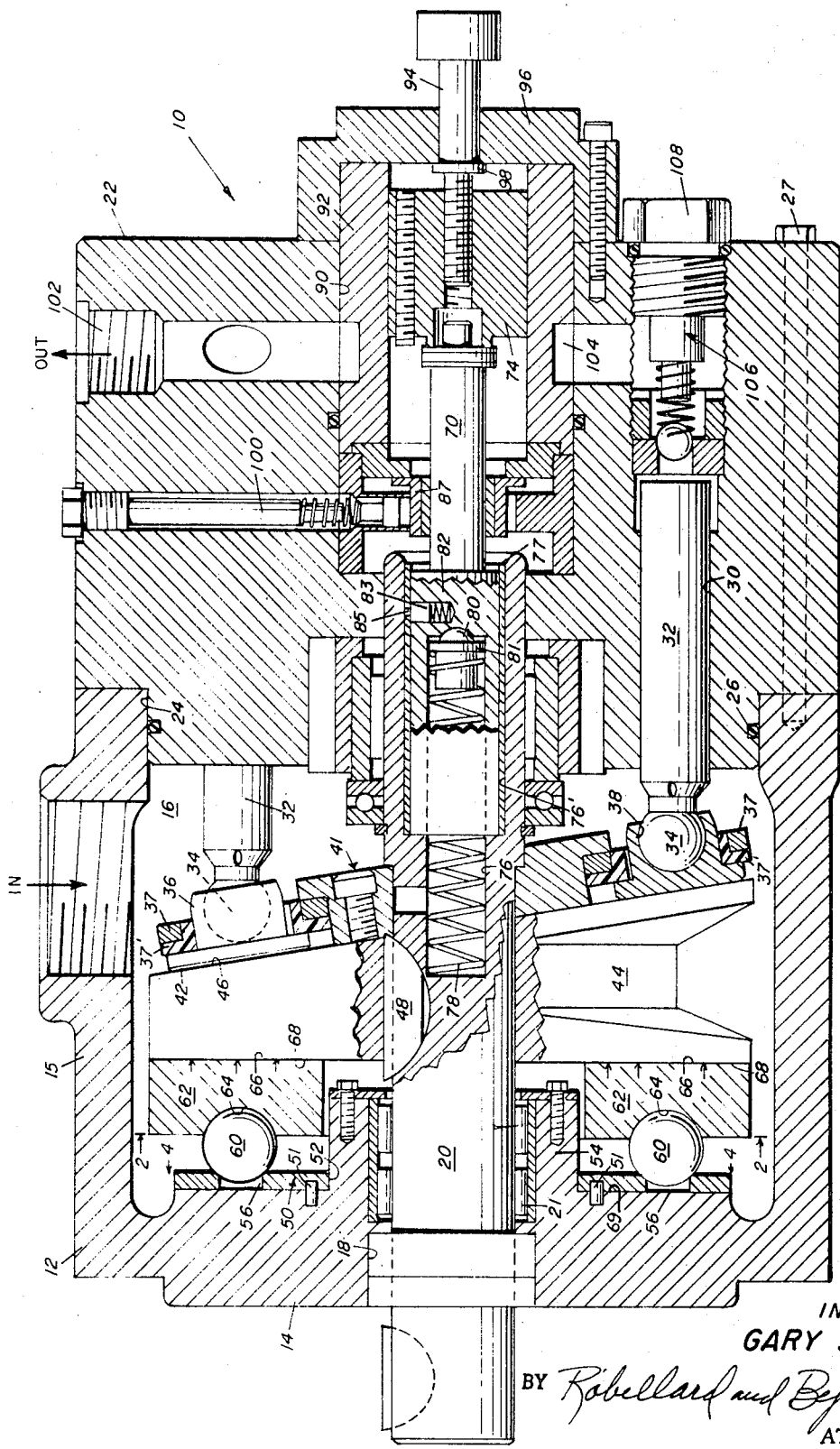
FIGURE 1 is a longitudinal sectional view of the translator.
Figure 2:
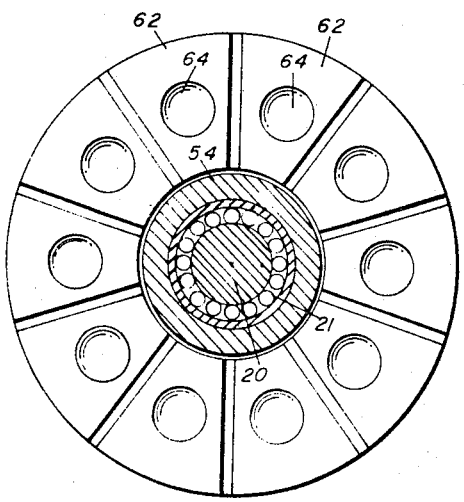
FIGURE 2 is a view along the line 2—2 in FIGURE 1.
Figure 4:
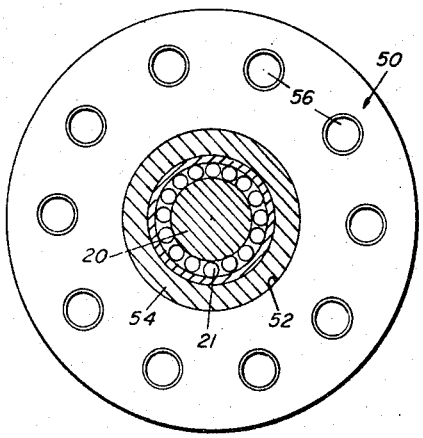
FIGURE 4 is a sectional view along the line 4—4 of FIGURE 1.
Figure 3:
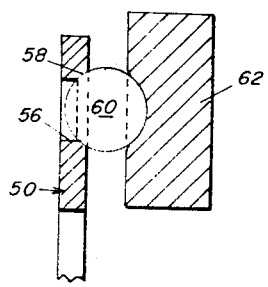
FIGURE 3 is an enlarged view of a portion of FIGURE 1.

Referring now with more particularity to the drawings wherein like numerals indicate like parts, the numeral 10 indicates the fluid translator of this invention. As described, the translator is a hydraulic pump but as will be more fully understood as the description progresses, many of the features disclosed herein will be suitable for similar translators used as fluid motors.

The pump 10 is comprised of a pump housing 12 which is terminated at one end by an integral end portion 14. Within the cylindrical portion 15 of the pump housing, a fluid inlet chamber 16 is defined. The end portion 14 is centrally apertured at 18 to receive an input power shaft 20. A suitable bearing and seal assembly 21 rotatably mounts the shaft with respect to the pump housing.

The other end of the housing 12 is closed by a barrel assembly 22. The inner end of the barrel assembly is reduced at 24 about which the cylindrical portion of the housing 15 is received. Fluid leakage is prevented between the housing 12 and the barrel assembly 22 by way of an annular seal 26 and the housing and assembly are secured together by a plurality of circumferentially spaced bolts 27. The barrel 22 is centrally bored at 28 and 29 to rotatably receive, the end of the power shaft 20 and for receiving the controls for variable output.

Spaced from the central opening 28 are a plurality of circumferentially arranged bores 30, each of which receives a reciprocating hollow piston 32. The outer ends of pistons 32 are formed with solid spherical heads 34 about which alloy slippers 36 are received. Each of the slippers 36 is formed with a concave spherical surface 38 pivotally receiving one of the aforementioned spherical heads. The outer ends of the slippers have planar surfaces 42 which engage the inclined surface 46 of a cam plate 44. It should be noted here that there is no direct fluid communication betweeen the interior of pistons 32 and the surface 46. Such communication is sometimes used in the art for purposes of developing a hydrostatic counterbalance between the slippers and the cam. The slippers are maintained against the cam plate by way of a steel keeper ring 37 having plastic inserts 37' in the shoe receiving openings thereof. The keeper ring is positioned with respect to the cam plate and shaft by a centrally located annular bracket 40 and a plurality of lock nuts 41. The cam plate 44 is secured to the shaft 20 by way of a half-round key 48 and, of course, rotates therewith.

An important objective of this invention is to provide a novel means for absorbing the thrust engendered by the reciprocation of pistons 32 when the pump is operating. These means consist of an annular cold-rolled, low-carbon steel support plate or seat forming member 50 which has a central opening 52 which fits over the exterior of the inwardly directed journal 54. Circumferentially spaced about the opening 52 are a plurality of openings 56 in said seat forming member 50 which serve as seats for a plurality of ball pivots 60. Disposed over each of the pivots 60 are individual, truncated pie-shaped, segments 62 of a metal harder than plate 50. The segments are formed with shallow concave surfaces 64 to closely engage less than half of each of the ball pivots 60. The segments 62 have second planar surfaces 66 which engage the rear surface 68 of the cam plate 44. The plate 50 is secured to housing 14 by pins 51. It is important in translators of this design that the surfaces 66 of the segments all be of a common height. In other words, the surfaces 66 must be in a common plane perpendicular to the longitudinal axis of the pump itself. This insures that the thrust forces are uniformly distributed on each of the bearing segments.

Due to manufacturing tolerances in the production of openings 56, balls 60 and segments 62, the above requirement of a common height cannot be economically satisfied through conventional manufacturing techniques. This invention embodies within its scope, a method of obtaining a common height of surfaces 66 through a unique method of forming seats 58.

Figure 5:
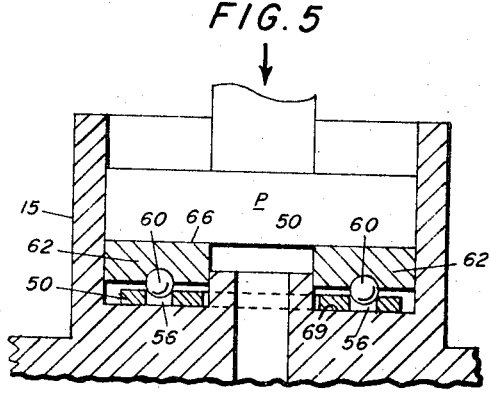
FIGURE 5 is a diagrammatic view illustrating one method of bearing location.

The plate 50, as previously stated, is manufactured of a cold-rolled, low-carbon steel, the ball pivots 60 are manufactured of a high carbon, very hard steel and the segments 62 can be of cast iron. One method of locating surfaces 66 takes place prior to the insertion of the cam plate 44 into the housing 12 or the attachment of barrel assembly 22. Referring particularly to the diagrammatic view of FIGURE 5, it is seen that the end 14 is secured such that the inner surface 69 thereof is accurately located. The plate 50 is secured in position over extension 54 and the pivot members 60 are placed over each of the openings 56. A segment 62 is then placed over each ball 60. At this time, the height of surfaces 66 will vary slightly due to manufacturing tolerances. A piston P having a direction normal to the inner surface 69 is lowered into housing 12 and a pressure, higher than the normal operating pressures of the pumping unit, is applied sufficient in force to deform the openings 56 to form inclined seats 58 an amount necessary to locate the surfaces 66 at a common height. Thus, the depth of seats 58 will vary in dimension from opening to opening in amounts sufficient to correct the manufacturing differences.

There is a second method of deforming the seats until the segment surfaces are in a common plane. In this second method the translator is fully assembled as shown in FIGURE 1. Shaft 20 is rotated and chamber 16 is subjected to pressures greatly in excess of normal operating pressure. The excess pressure is reflected in high piston forces which must be taken through the pivot members 60. The pivot members thus deform their seats until a common height of surfaces 66 is obtained. Thereafter these heights are retained at normal operating pressures.

Thereafter, the remainder of the pump is assembled. The shaft 20 is extended inwardly of the barrel housing 22 to engagement with a variable control assembly. The shaft 20 is bored at 76 to receive a coil spring 78 which urges a spring follower 80 against a cap member 82 which has extending therefrom a cam carrier 70. The compression of coil spring 78 against the finage 81 of the spring follower 80 results in biasing the cap member and the cam carrier toward the stem controlled member 74. The cap member carries an outwardly biased pin 83 which engages a helix groove 85 in a sleeve member 86 that is secured in the counter bore 76 by a snap ring 77. An eccentric 87 is fixedly secured to the periphery of the cam carrier 70. From the construction thus far described, it is seen that a longitudinal movement of carrier 70 will rotatably position the cam circumferentially as a result of the camming effect of pin 83 riding in the helix 85.

The barrel 22 is counterbored at 90. Fixedly received in the counterbore is a sleeve 92 which slidably receives an abutment member 74. The abutment member theradably receives an adjustment stem 94 therein. The bore 90 and sleeve 92 are enclosed by a cap 96 through which the stem 94 extends. Intermediate the length of stem 94 is a flange 98 which engages the inner surface of cap 96. Since cap 96 is stationary, the member 74 is longitudinally adjustable via rotation of stem 94.

The cam carrier 70 is biased against the abutment member 74. Therefore, a longitudinal movement in member 94 causes a longitudinal movement in carrier 70. With this last mentioned movement there is a corresponding rotational positioning of eccentric 87.

Disposed radially outwardly from the eccentric are a plurality of poppet members 100 which when elevated by the eccentric during a pumping stroke, bypass a portion of the piston outputs to the intake chamber 16. Variation in pump output is variable by the position or phase relationship of the eccentric with respect to the pumping strokes. The outputs from pistons 32 are collected in annular chamber 104 and delivered to the load through outlet 102. To prevent backflow the checkball arrangement 105 is positioned by a plug 108. The means for obtaining variable flow from a pump of this same general design is more fully explained in the Stewart patent Re. 25,850 issued Sept. 7, 1965.

In operation, the cam plate 44 is rotated by shaft 20. Since plate 50 and thus segments 66 are positively held stationary within the housing, a relative rotation develops between the segments and the cam plate. A film of the hydraulic fluid is developed between the cam plate and the pivotally mounted segments and a hydrostatic head is developed in opposition to the piston forces. A similar head is developed between the surface 46 and the surfaces 42 of the slipper members. The pressures exerted by the oil film increase with an incerase in load.

In a general manner, while there has been disclosed effective and efficient embodiments of the invention, it should be well understood that the invention is not limited to such embodiments, as there might be changes made in the arrangement, disposition, and form of the parts without departing from the principle of the present invention.

What is new and, therefore, desired to be protected by Letters Patent of the United States is:

1. A fluid translator comprising a barrel having a plurality of parallel cylindrical bores fromed therein, a housing at one end of said barrel and forming a chamber therewith, a shaft rotatably received through said housing about an axis parallel to the center axes of said bores and having an inner end disposed in said chamber, a cam plate fixedly secured to said shaft and having a first surface normal to said shaft, a pumping piston in each of said bores and having ends extending into said chamber, means to maintain said ends in engagement with said surface through a relative rotation of said cam plate with respect to said barrel, and bearing means disposed between said housing and said second surface, said bearing means including a seat forming member forming a plurality of seats disposed about said shaft, a ball pivot member in each of said seats, a plurality of segments each having a depression in one surface thereof receiving one of said ball pivots, said segments thereby being adapted for pivotal movement and having planar surfaces engaging said second surface, whereby the force between said second surface and said housing is transmitted solely by said segments, said ball pivots and said seat forming member, said seat forming member having a hardness less than that of said ball pivot members, whereby any irregularity in the ball pivots is compensated for by the difference in hardness between the seat forming member and said ball pivots.

2. A fluid translator comprising a barrel having a plurality of parallel cylindrical bores formed therein, a housing at one end of said barrel and forming a chamber therewith, a shaft rotatably received through said housing about an axis parallel to the center axes of said bores and having an inner end disposed in said chamber, a cam plate fixedly secured to said shaft and having a first surface normal to said shaft, a pumping piston in each of said bores and having outer ends extending onto said chamber, a slipper pivotally received on each of said outer ends, each of said slippers having a first planar surface in engagement with said first surface of said cam, an annular retainer assembly secured to said first surface of said cam for retaining said slippers in engagement with said first surface, said retainer assembly comprising, a ring having a plurality of openings therein for receiving said slippers, and plastic inserts disposed in said openings engaging said slippers, and bearing means disposed between said housing and said second surface, said bearing means including a seat forming member forming a plurality of seats disposed about said shaft, a ball pivot member in each of said seats, a plurality of segments each having a depression in one surface thereof receiving one of said ball pivots, said segments thereby being adapted for pivotal movement and having planar surfaces engaging said second surface, whereby the force between said second surface and said housing is transmitted solely by said segments, said ball pivots and said seat forming member, said seat forming member having a hardness less than that of said ball pivot members, whereby any irregularity in the ball pivots is compensated for by the difference in hardness between the seat forming member and said ball pivots,

References Cited
UNITED STATES PATENTS

| | | | |
|---|---|---|---|
| 1,523,707 | 1/1925 | Nagel | 103—162 X |
| 2,155,455 | 4/1939 | Thoma | 103—162 |
| 2,499,651 | 3/1950 | Kendrick | 308—233 |
| 2,977,887 | 4/1961 | Norlin | 103—173 X |
| 3,096,723 | 7/1963 | Puryear | 103—162 |
| 3,289,604 | 12/1966 | Wahlmark | 103—162 |
| 3,292,554 | 12/1966 | Hessler | 103—173 |
| 3,255,638 | 6/1966 | Livers | 103—173 |

WILLIAM L. FREEN, *Primary Examiner.*

U.S. Cl. X.R.

29—149.5; 308—233